No. 772,018. Patented October 11, 1904.

UNITED STATES PATENT OFFICE.

ELIZABETH N. ALEXANDRIAN, OF FRESNO, CALIFORNIA.

PROCESS OF PRESERVING CITRUS FRUITS.

SPECIFICATION forming part of Letters Patent No. 772,018, dated October 11, 1904.

Application filed December 9, 1903. Serial No. 184,505. (No specimens.)

*To all whom it may concern:*

Be it known that I, ELIZABETH N. ALEXANDRIAN, a subject of the Sultan of Turkey in Europe, residing at Fresno, in the county of Fresno and State of California, have invented a certain new and useful process of treating unripe (or baby) oranges and other citrus fruits in order to preserve the same and to transform the same into a palatable confection, of which the following is a specification.

Take the unripe oranges or other citrus fruit to be treated when they are only partly grown, preferably when they are about one inch in diameter; with a small knife or other instrument scoop a hole about three-eighths of an inch in diameter through the center of the fruit from end to end, thus removing the core or seeds from the fruit; place the fruit in cold water for twenty-four hours; cover the fruit with fresh water and boil slowly for nine or ten hours; place the fruit in cold water, changing the water twice a day for about one week; boil the fruit for about five minutes in a syrup made by dissolving two pounds of sugar in one gallon of water; then place the fruit on a dry cloth to drain; then either place the fruit in jars and cover with a thick syrup made with three or four pounds of sugar to a gallon of water or crystallize the fruit by rolling in dry sugar.

What I claim as my invention, and desire to secure by Letters Patent, is—

The process for preserving unripe, partly-grown oranges and other citrus fruits, consisting in removing the core or seeds therefrom, and subjecting the fruit to the action of cold water for about twenty-four hours, then of boiling water for about ten hours, then of cold water for about one week, then of boiling syrup for about five minutes, then, after draining, applying saccharine matter, substantially as herein described.

ELIZABETH N. ALEXANDRIAN.

Witnesses:
   N. H. HARRIS,
   W. A. CONN.